United States Patent
Baker et al.

(10) Patent No.: US 10,158,715 B2
(45) Date of Patent: Dec. 18, 2018

(54) METHOD AND APPARATUS FOR OPTIMIZING MEMORY UTILIZATION IN GATEWAY OF PROCESS CONTROL AND AUTOMATION SYSTEM

(71) Applicant: Honeywell International Inc., Morris Plains, NJ (US)

(72) Inventors: Michael L. Baker, Perkasie, PA (US); Girish Krishnanivas, Delhi (IN); Raj Bandekar, Lansdale, PA (US); Senthilkumar Dhanagopalan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 298 days.

(21) Appl. No.: 14/871,455

(22) Filed: Sep. 30, 2015

(65) Prior Publication Data

US 2016/0269230 A1    Sep. 15, 2016

Related U.S. Application Data (60) Provisional application No. 62/130,888, filed on Mar. 10, 2015.

(51) Int. Cl.
*H04L 29/08* (2006.01)
*H04L 29/06* (2006.01)
*H04M 3/42* (2006.01)

(52) U.S. Cl.
CPC .............. *H04L 67/12* (2013.01); *H04L 67/34* (2013.01); *H04L 67/06* (2013.01); *H04L 69/08* (2013.01); *H04M 3/42178* (2013.01)

(58) Field of Classification Search
CPC ......... H04L 67/34; H04L 67/06; H04L 69/08; H04L 67/025; H04L 67/12

USPC ........................................... 709/226; 719/313
See application file for complete search history.

(56) References Cited

U.S. PATENT DOCUMENTS

| | | |
|---|---|---|
| 2002/0073291 A1 | 6/2002 | Vincent |
| 2008/0127210 A1* | 5/2008 | Bosold .................. H04L 67/025 719/313 |
| 2008/0235355 A1 | 9/2008 | Spainer et al. |
| 2011/0158244 A1 | 6/2011 | Long et al. |
| 2014/0025321 A1* | 1/2014 | Spanier ................ G01R 21/133 702/62 |

(Continued)

FOREIGN PATENT DOCUMENTS

WO    WO 2008-144334 A1    11/2008

OTHER PUBLICATIONS

CIM users group, IEC Substation Configuration Language Summary, Aug. 2006, cimug.ucaiug.org,http://cimug.ucaiug.org/Harmonization%20Documents/EPRI%20Harmonization%20Project%20Notes%20and%20Minutes/IEC%20TC57%20Substation%20Configuration%20Language%20Summary.pdf.*

(Continued)

*Primary Examiner* — David R Lazaro
*Assistant Examiner* — Zi Ye (57) ABSTRACT

A method for optimizing memory utilization in a gateway of a process control and automation system is provided. The method includes obtaining, for a selected intelligent electronic device (IED), a configured IED description (CID) file associated with the selected IED. The CID file is filtered to generate a filtered CID file. The filtered CID file is provided to the gateway, which is configured to use the filtered CID file to communicate with the selected IED.

20 Claims, 5 Drawing Sheets

(56) References Cited

U.S. PATENT DOCUMENTS

2014/0282021 A1* 9/2014 Dolezilek ............... H04L 41/22
715/735
2015/0294037 A1* 10/2015 Caird ................. G06F 17/5004
703/1

OTHER PUBLICATIONS

Technical Brief, "System Engineer Configures IEC 61850 Gateway to DNP3 Substation", dated Aug. 10, 2010, 15 pgs.
Technical Brief, IEC, "Substation Configuration Language", Summary, Aug. 2006, 13 pgs.
Flores et al., "Case Study: Design and Implementation of IEC 61850 From Multiple Vendors at CFE La Venta II", 60th Annual Conference for Protective Relay Engineers, Mar. 2007, 15 pgs.
Notification of Transmittal of the International Search Report and the Written Opinion of the International Searching Authority, or the Declaration dated Jul. 28, 2016 in connection with International Patent Application No. PCT/US2016/019258.

* cited by examiner

METHOD AND APPARATUS FOR OPTIMIZING MEMORY UTILIZATION IN GATEWAY OF PROCESS CONTROL AND AUTOMATION SYSTEM

CROSS-REFERENCE TO RELATED APPLICATION AND CLAIM OF PRIORITY

The present application is related to U.S. Provisional Patent Application No. 62/130,888, filed Mar. 10, 2015, titled "APPARATUS AND METHOD FOR OPTIMIZING MEMORY UTILIZATION IN GATEWAY OF PROCESS CONTROL AND AUTOMATION SYSTEM." Provisional Patent Application No. 62/130,888 is assigned to the assignee of the present application and is hereby incorporated by reference into the present application as if fully set forth herein. The present application hereby claims priority under 35 U.S.C. § 119(e) to U.S. Provisional Patent Application No. 62/130,888.

TECHNICAL FIELD

This disclosure relates generally to industrial process control and automation systems. More specifically, this disclosure relates to a method and apparatus for optimizing memory utilization in a gateway of a process control and automation system.

BACKGROUND

Industrial plants are often controlled and maintained by industrial process control and automation systems. A control and automation system contains various components, such as servers, clients, controllers, gateways, sensors, transmitters and field devices, which are used to control and automate all or substantially all of an industrial plant. Communication and transmission of critical process data among these components plays a major role in automation and maintenance of plant operations.

In a distributed control and automation system, the system often communicates with field devices through a gateway, which is responsible for transferring data to and from the field devices. Because a gateway stores information about these field devices, the number of field devices with which a gateway may communicate is limited by the amount of memory available in the gateway.

SUMMARY

This disclosure provides a method and apparatus for optimizing memory utilization in a gateway of a process control and automation system.

In one embodiment, a method for optimizing memory utilization in a gateway of a process control and automation system is provided. The method includes obtaining, for a selected intelligent electronic device (IED), a configured IED description (CID) file associated with the selected IED. The CID file is filtered to generate a filtered CID file. The filtered CID file is provided to the gateway, which is configured to use the filtered CID file to communicate with the selected IED.

In another embodiment, a method for optimizing memory utilization in a gateway of a process control and automation system is provided. The method includes obtaining, for a selected IED, a CID file associated with the selected IED. A portion of the CID file is removed to generate a selective CID file. A portion of the selective CID file is removed to generate a trimmed CID file. The trimmed CID file is provided to the gateway, which is configured to use the trimmed CID file to communicate with the selected IED.

In yet another embodiment, an apparatus for optimizing memory utilization in a gateway of a process control and automation system is provided. The apparatus includes a data repository and a memory optimizer. The data repository is configured to store, for a selected IED, a CID file associated with the selected IED. The memory optimizer is configured to remove a portion of the CID file to generate a selective CID file, to remove a portion of the selective CID file to generate a trimmed CID file, and to provide the trimmed CID file to the gateway. The gateway is configured to use the trimmed CID file to communicate with the selected IED.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
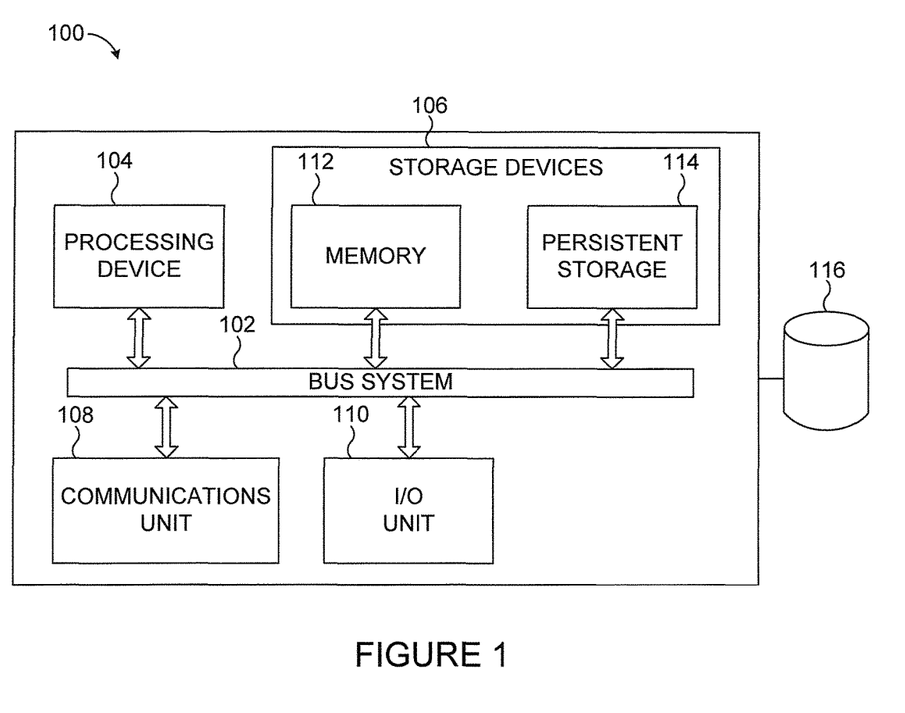
FIG. 1 illustrates a device for optimizing memory utilization in a gateway of an industrial process control and automation system according to an embodiment of this disclosure.

FIG. 1 illustrates a device 100 for optimizing memory utilization in a gateway of an industrial process control and automation system according to an embodiment of this disclosure. The embodiment of the device 100 shown in FIG. 1 is for illustration only. Other embodiments of the device 100 could be used without departing from the scope of this disclosure.

As shown in FIG. 1, the device 100 includes a bus system 102, which supports communication between at least one processing device 104, at least one storage device 106, at least one communications unit 108 and at least one input/output (I/O) unit 110.

The processing device 104 is configured to execute instructions that may be loaded into a memory 112. The processing device 104 may include any suitable number(s) and type(s) of processors or other devices in any suitable arrangement. Types of processing devices 104 may include microprocessors, microcontrollers, digital signal processors, field-programmable gate arrays, application-specific integrated circuits, processing circuitry, discrete circuitry or the like.

The memory 112 and a persistent storage 114 are examples of storage devices 106, which represent any structure(s) capable of storing and facilitating retrieval of information (such as data, program code and/or other suitable information) on a temporary or permanent basis. The memory 112 may represent a random access memory or any other suitable volatile or non-volatile storage device(s). The persistent storage 114 may contain one or more components or devices supporting longer-term storage of data, such as a ready only memory, hard drive, Flash memory or optical disc.

The communications unit 108 is configured to support communications with other systems or devices. For example, the communications unit 108 could include a network interface card or a wireless transceiver facilitating communications over a network. The communications unit 108 may support communications through any suitable physical or wireless communication link(s).

The I/O unit 110 is configured to allow input and output of data. For example, the I/O unit 110 may provide a connection for user input through a keyboard, mouse, keypad, touchscreen or other suitable input device. The I/O unit 110 may also send output to a display, printer, or other suitable output device.

The phrase "Intelligent Electronic Device," or "IED," is often used in the electric power industry to describe microprocessor-based controllers of power system equipment, such as circuit breakers, transformers and capacitor banks. Various IEDs in the field can be coupled to gateways, and control and automation systems can access data in the IEDs through the gateways. The device 100 represents a computing device that may be configured to execute a memory optimizing tool (such as one implemented in software) for reducing file size in order to maximize memory space in the gateways.

For example, as described in more detail below in connection with FIGS. 2-6, the memory optimizing tool may reduce file sizes for those files stored in a gateway that include information for IEDs associated with the gateway, which are referred to as configured IED description (CID) files. Thus, additional memory space is made available in the memory of the gateway, which allows additional CID files to be stored in the memory. As a result, the gateway may communicate with an increased number of IEDs as compared to a gateway that stores full-size CID files.

The device 100 also includes, is coupled to, or is otherwise used in conjunction with a data repository 116. As described below, the data repository 116 can be used to store the full-size CID files, as well as the reduced-size files generated by the device 100. The data repository 116 may include any suitable structure for storing and facilitating retrieval of information, such as a database.

Although FIG. 1 illustrates one example of a device 100 for optimizing memory utilization in a gateway of an industrial process control and automation system, various changes may be made to the embodiment shown in FIG. 1. For example, various components in FIG. 1 could be combined, further subdivided, or omitted and additional components could be added according to particular needs. Also, computing devices can come in a wide variety of configurations, and FIG. 1 does not limit this disclosure to any particular configuration of computing device.

Figure 2:
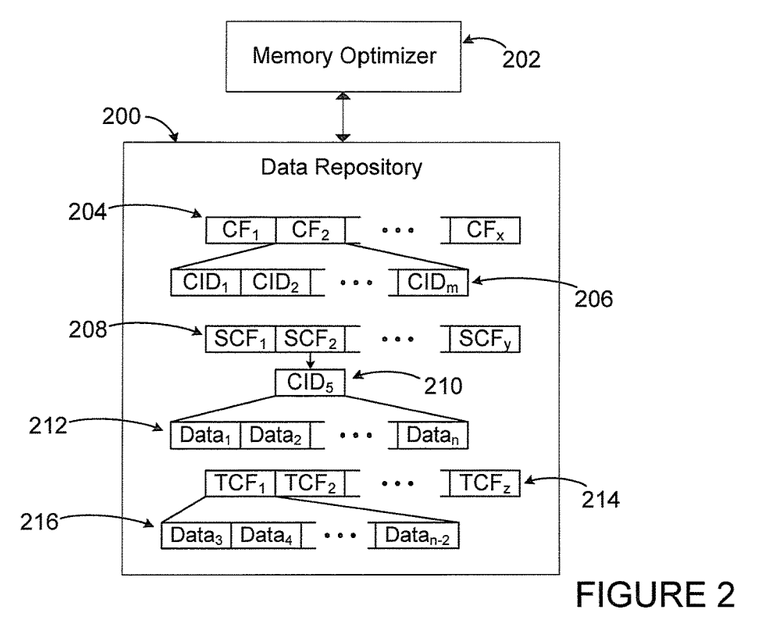
FIG. 2 illustrates a data repository and a memory optimizer for a gateway of an industrial process control and automation system according to an embodiment of this disclosure.

FIG. 2 illustrates a data repository 200 and a memory optimizer 202 for a gateway of an industrial process control and automation system according to an embodiment of this disclosure. The embodiments of the data repository 200 and the memory optimizer 202 shown in FIG. 2 are for illustration only. Other embodiments of the data repository 200 and the memory optimizer 202 could be used without departing from the scope of this disclosure. For some embodiments, the data repository 200 may correspond to the data repository 116 of FIG. 1, and the memory optimizer 202 may correspond to a program stored in the memory 112 that may be executed by the processing device 104 of FIG. 1.

In the illustrated embodiment, the data repository 200 is configured to store a plurality of CID files ($CF_{1-x}$) 204. Each CID file 204 may include CID information for a plurality of IEDs. For example, $CF_2$ may include CID information for m IEDs ($CID_{1-m}$) 206. The memory optimizer 202 may be configured to perform memory optimization by filtering CID files 204 in order to generate reduced-size, filtered CID files, such as selective CID files or trimmed CID files.

Thus, the memory optimizer 202 may be configured to perform a first phase of memory optimization by reducing the size of specified CID files 204 in order to generate a plurality of selective CID files ($SCF_{1-y}$) 208. As described in more detail below, for some embodiments, the memory optimizer 202 may generate a selective CID file 208 by retaining CID information for a selected IED from a corresponding CID file 204 and deleting the CID information for the remaining, unselected IEDs in the corresponding CID file 204. Thus, each selective CID file 208 may include CID information for a single IED. For example, $SCF_2$ may include CID information for a fifth IED ($CID_5$) 210. This CID information 210 includes a plurality of pieces of data ($Data_{1-n}$) 212. The Data 212 may include communication information; IED data descriptions, such as logical device, logical nodes, parameters, and data type definitions for the logical devices, logical nodes, and parameters; vendor-specific private information; comments and white spaces; substation information and/or any other suitable information related to the selected IED.

For an alternative embodiment, the memory optimizer 202 may generate a selective CID file 208 by retaining CID information for a subset of IEDs (instead of a single IED) in a corresponding CID file 204 and deleting the CID information for the remaining IEDs in the corresponding CID file 204. For this embodiment, each selective CID file 208 may include CID information for multiple IEDs but fewer IEDs than are included in the full-size CID file 204.

The memory optimizer 202 may also be configured to perform a second phase of memory optimization by reducing the size of specified selective CID files 208 in order to generate a plurality of trimmed CID files ($TCF_{1-z}$) 214. As described in more detail below, the memory optimizer 202 may generate a trimmed CID file 214 by retaining a subset of the Data 212 included in the corresponding selective CID file 208 and deleting the remaining Data 212 in the corresponding selective CID file 208. Thus, each trimmed CID file 214 may include a subset of the CID information for the single IED (or subset of IEDs) that is associated with the selective CID file 208. For example, if $TCF_1$ corresponds to the second selective CID file ($SCF_2$) 208, $TCF_1$ may include $Data_3$, $Data_4$ and other relevant pieces of data through $Data_{n-2}$ as retained pieces of data 216. The retained Data 216 may correspond to information actually used by the control and automation system.

Thus, the memory optimizer 202 is configured to reduce the size of a CID file 204 by removing CID information for unselected IEDs from the CID file 204 to generate a selective CID file 208 for a single, selected IED. The memory optimizer 202 is also configured to further reduce the size of the selective CID file 208 by removing extraneous Data 212 from the selective CID file 208 to generate a trimmed CID file 214 for the selected IED. The trimmed CID files 214, instead of the much larger CID files 204, may then be downloaded to a gateway. In this way, the utilization of memory in the gateway is optimized, resulting in an increase in the number of IEDs with which the gateway is able to communicate.

Although FIG. 2 illustrates one example of a data repository 200 and a memory optimizer 202, various changes may be made to the embodiment shown in FIG. 2. For example, components in FIG. 2 could be combined, further subdivided, or omitted and additional components could be added according to particular needs. For example, for some embodiments, the memory optimizer 202 may be configured to generate selective CID files 208 and not trimmed CID files 214. In addition, selective CID files 208 could be stored in a gateway instead of or in addition to trimmed CID files 214.

Figure 3:
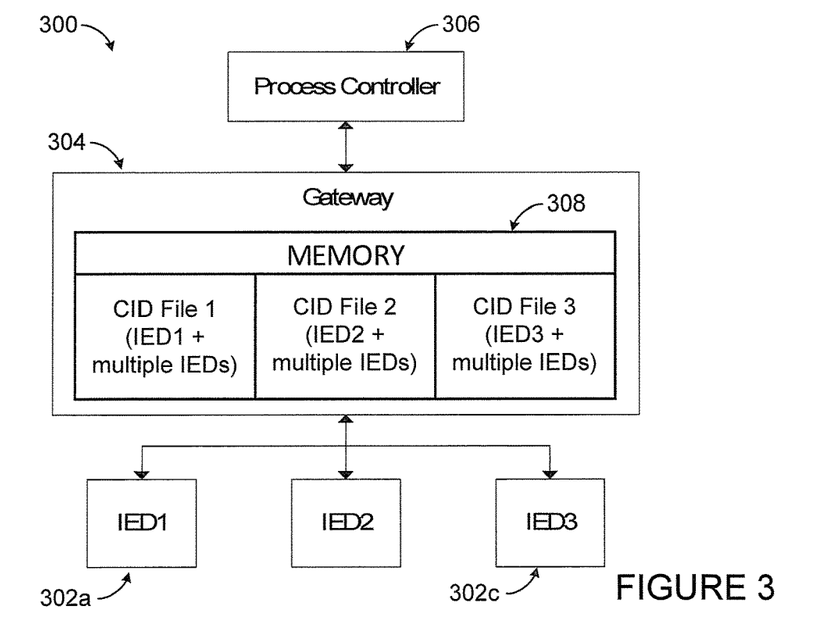
FIGS. 3 and 4 illustrate memory utilization and optimization in a gateway of an industrial process control and automation system according to an embodiment of this disclosure.
Figure 4:
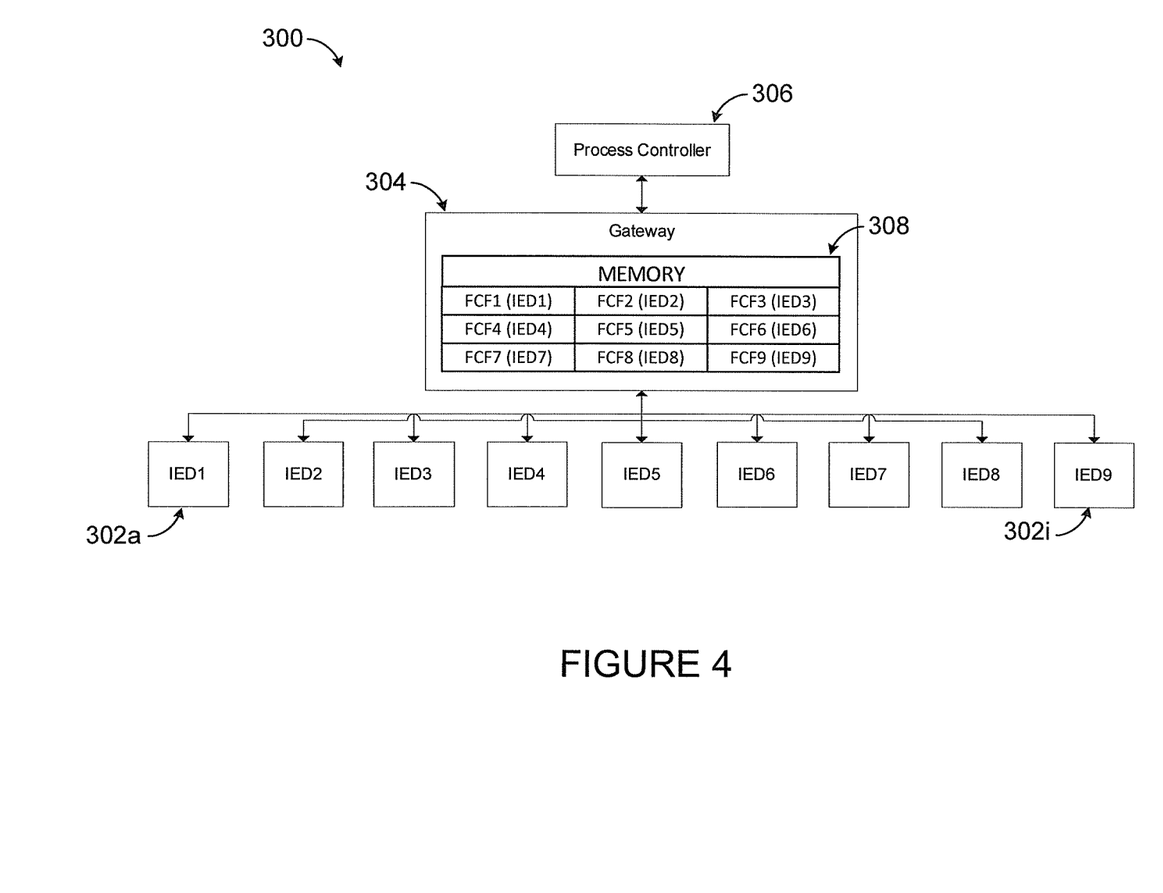

FIGS. 3 and 4 illustrate memory utilization and optimization in a gateway of an industrial process control and automation system 300 according to an embodiment of this disclosure. The embodiment of the system 300 shown in FIGS. 3 and 4 is for illustration only. Other embodiments of the system 300 could be used without departing from the scope of this disclosure.

As shown in FIG. 3, the system 300 includes various Intelligent Electronic Devices (IEDs) 302a-302c. As described above, each IED 302a-302c denotes any suitable electronic device with built-in intelligence. For example, the IEDs 302a-302c could include microprocessor-based controllers of power system equipment, such as circuit breakers, transformers, capacitor banks or the like.

The IEDs 302a-302c are communicatively coupled (via wired or wireless communication paths) to at least one gateway 304. Each gateway 304 is configured to transfer data to and from the IEDs 302a-302c. Also, each gateway 304 is configured to translate between one or more protocols used by the IEDs 302a-302c and one or more protocols used by higher-level components in the control and automation system 300. Each gateway 304 includes any suitable structure for facilitating communication with multiple IEDs 302a-302c.

One or more process controllers 306 are coupled to the gateway 304. Among other things, the process controllers 306 are configured to interact with and control the IEDs 302a-302c. For example, a process controller 306 could receive data from one or more IEDs 302a-302c or from one or more sensors measuring characteristics associated with the IEDs 302a-302c. The process controller 306 could also generate control signals for one or more IEDs 302a-302c or for one or more actuators associated with the IEDs 302a-302c. Each process controller 306 includes any suitable structure for interacting with and controlling one or more components. As a particular example, each process controller 306 could represent a computing device running a real-time operating system.

Higher-level components of the control and automation system 300 (such as the process controller 306) are configured to interact with the IEDs 302a-302c through the gateway 304. As previously described, a CID file includes communication, data and data type information related to multiple IEDs. Thus, a CID file includes information relating to logical devices and logical nodes for each of the multiple IEDs that is associated with the CID file. CID files can comply with an industry standard, such as the IEC61850 standard from the International Electrotechnical Commission. CID files may be downloaded into a memory 308 of the gateway 304, and the gateway 304 is configured to use the information in each CID file to identify and communicate with an IED in the field. For example, if the gateway 304 is coupled to three IEDs 302a-302c, three CID files (one for each IED in the field) are typically downloaded to the gateway 304.

The sizes of the CID files stored in the gateway 304 can have a direct correlation with the number of IEDs that can be coupled to the gateway 304. An embedded gateway platform often has limited memory resources, and loading complete CID files containing information for multiple IEDs can consume too much of this limited memory, severely limiting the number of IEDs that can be coupled to the gateway 304. As a result, a project with a large number of IEDs may require a large number of gateways or retrofitting gateways to include a larger amount of memory, either of which increases the project costs. In addition, storing information related to all the logical devices and logical nodes of the IEDs that are in communication with the gateway 304 can result in an inefficient use of memory because the control and automation system 300 may not actually use data from all the logical devices and nodes of each of the IEDs.

FIG. 3 depicts the gateway 304 communicating with only three IEDs 302a-302c in the field. In this example, the memory 308 in the gateway 304 is fully utilized by three full-size CID files, each of which contains information for multiple IEDs in addition to a particular one of the IEDs 302a-302c coupled to the gateway 304. For example, CID File 1 includes information for IED1 302a, in addition to information for multiple other IEDs that are not coupled to the gateway 304.

As described above, a memory optimizer 202 is configured to filter the CID files to remove unnecessary or unneeded information. Thus, a larger number of filtered CID files (FCF) can be stored in the memory 308 of the gateway 304 as compared to the number of full-size CID files that can be stored. FIG. 4 depicts the same gateway 304 communicating with nine IEDs 302a-302i in the field. Thus, the memory 308 includes nine filtered CID files (FCF1-FCF9). The filtered CID files illustrated in FIG. 4 may represent selective CID files, trimmed CID files or a combination of selective and trimmed CID files.

As previously described, the filtered CID files downloaded to the gateway 304 contain information specific to the nine IEDs 302a-302i coupled to the gateway 304. For example, FCF1 includes information specific to IED1 302a and does not include information for other IEDs. Because a control and automation system 300 may not need data from all logical devices or logical nodes of an IED, the memory optimizer 202 may also be configured to optimize memory utilization in the gateway 304 by retaining a subset of the communication data, logical devices, logical nodes, data and data type information from a CID file in the filtered CID file. Thus, the filtered CID file that is downloaded to the gateway 304 may include only the required logical devices and logical nodes of the IED associated with the filtered CID file.

During operation, for some embodiments, after confirmation from a user, the tool can remove from the full-size CID file the information for other IEDs (thereby generating a selective CID file, as described above in connection with FIG. 2), as well as unreferenced logical devices and logical nodes of the IED (thereby generating a trimmed CID file).

In this way, the size of the filtered CID file to be downloaded to the gateway 304 may be substantially reduced. For example, for the embodiment illustrated in FIG. 4, the memory 308 in the gateway 304 may store up to nine filtered CID files and, thus, communicate with nine IEDs 302a-302i, instead of only three.

Although FIGS. 3 and 4 illustrate example memory utilizations in a gateway 304 of an industrial process control and automation system 300, various changes may be made to the embodiments shown in FIGS. 3 and 4. For example, the numbers of IEDs and the numbers of associated CID files and filtered CID files in FIGS. 3 and 4 are for illustration only. Also, while not shown, various higher-level components could be used with the system 300, such as higher-level process controllers.

Figure 5:
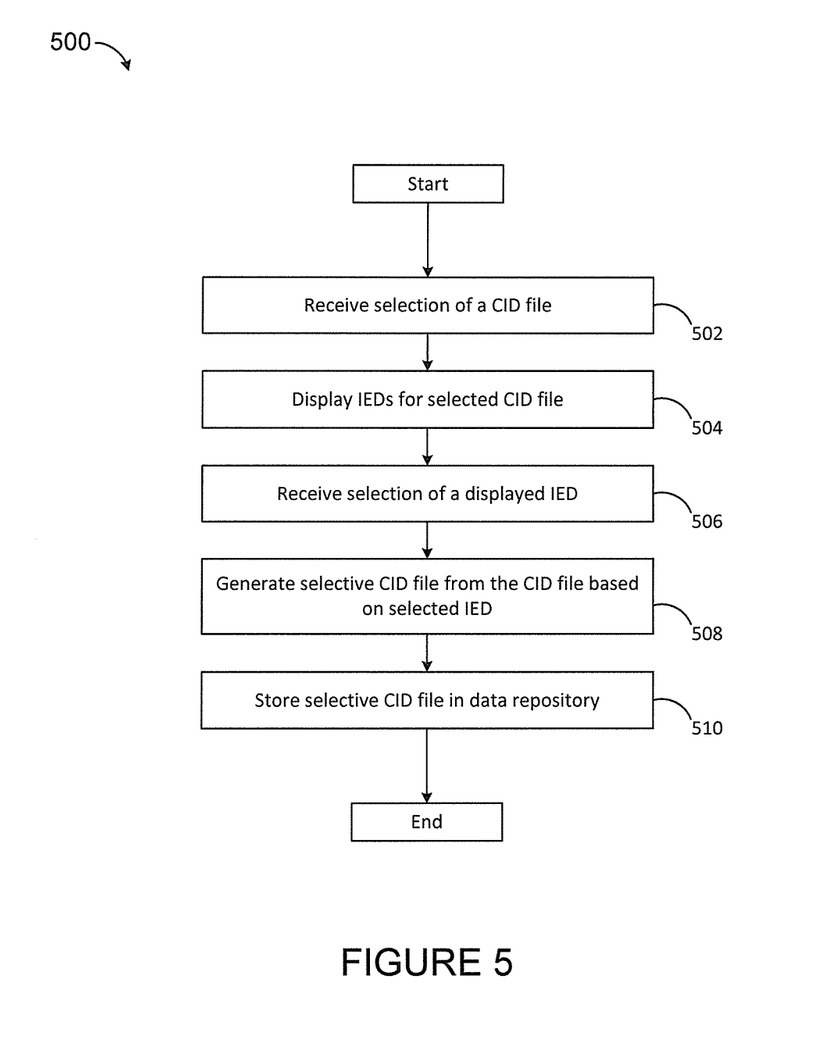
FIGS. 5 and 6 illustrate methods for optimizing memory utilization in a gateway of an industrial process control and automation system according to an embodiment of this disclosure.
Figure 6:
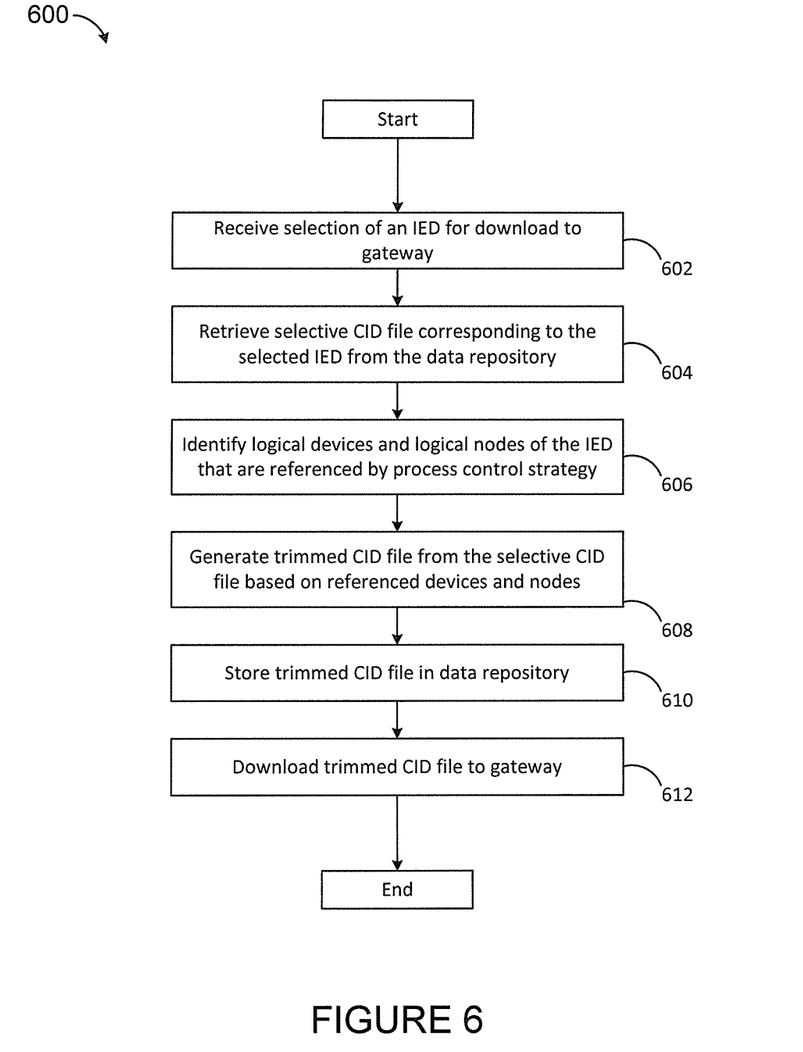

FIGS. 5 and 6 illustrate methods 500 and 600 for optimizing memory utilization in a gateway of an industrial process control and automation system according to an embodiment of this disclosure. The methods 500 and 600 shown in FIGS. 5 and 6 are for illustration only. Memory optimization for the gateway may be provided in any other suitable manner without departing from the scope of this disclosure. For ease of explanation, the methods 500 and 600 are described with respect to the gateway 304 in the system 300.

In some embodiments, the method 500 of FIG. 5 may correspond to a first phase of memory optimization, while the method 600 of FIG. 6 may correspond to a second phase of memory optimization. As shown in FIG. 5, during the first phase, a memory optimizer 202 receives a selection from a user of a CID file 204 (step 502). The memory optimizer 202 displays the IEDs associated with the selected CID file 204 (step 504). The memory optimizer 202 receives a selection from the user of one of the displayed IEDs (step 506). For an alternative embodiment, the memory optimizer 202 may receive a selection from the user of a subset of the displayed IEDs.

The memory optimizer 202 generates a selective CID file 208 from the CID file 204 based on the selected IED (step 508). In particular, for some embodiments, the memory optimizer 202 generates the selective CID file 208 by retaining information for the selected IED in the CID file 204 and deleting information for the remaining, unselected IEDs from the CID file 204. The memory optimizer 202 stores the selective CID file 208 in the data repository 200 (step 510).

As shown in FIG. 6, during the second phase, the memory optimizer 202 receives a selection from a user of an IED for download to a gateway, such as gateway 304 (step 602). The memory optimizer 202 retrieves a copy of the selective CID file 208 corresponding to the selected IED from the data repository 200 (step 604). The memory optimizer 202 identifies logical devices and logical nodes of the IED that are referenced by a process control strategy (step 606). In particular, for some embodiments, a process control strategy may reference some logical devices and/or logical nodes of the IED, while the process control strategy does not need information from other logical devices and/or logical nodes. Thus, the memory optimizer 202 may identify which of the devices and nodes are actually referenced by the process control strategy.

The memory optimizer 202 generates a trimmed CID file 214 from the selective CID file 208 based on the referenced logical devices and logical nodes (step 608). In particular, for some embodiments, the memory optimizer 202 generates the trimmed CID file 214 by retaining information for the referenced devices and nodes in the selective CID file 208 and deleting information for the remaining, unreferenced devices and nodes from the selective CID file 208. The memory optimizer 202 stores the trimmed CID file 214 in the data repository 200 (step 610). The trimmed CID file 214 is downloaded to the memory 308 of the gateway 304 (step 612). In this way, utilization of the memory 308 is optimized, and the number of IEDs that may be coupled to the gateway 304 is substantially increased.

Although FIGS. 5 and 6 illustrate examples of methods 500 and 600 for optimizing memory utilizations in a gateway of an industrial process control and automation system, various changes may be made to the embodiments of FIGS. 5 and 6. For example, one or more operations shown in FIG. 5 could be incorporated into FIG. 6, or one or more operations shown in FIG. 6 could be incorporated into FIG. 5. Also, while shown as a series of steps, various steps in each figure could overlap, occur in parallel, occur in a different order, or occur any number of times. In addition, for some embodiments, a selective CID file 208 may be downloaded into the memory 308 of the gateway 304 instead of a trimmed CID file 214 being downloaded.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   obtaining, by at least one processing device for a selected intelligent electronic device (IED), a configured IED description (CID) file comprising information associated with the selected IED and information associated with a plurality of unselected IEDs;
   filtering, by the at least one processing device, the CID file by removing the information in the CID file associated with the unselected IEDs to generate a selective CID file;
   storing, by the at least one processing device, the selective CID file in a data repository;
   receiving, by the at least one processing device, a selection of the selected IED for download to a gateway;
   retrieving, by the at least one processing device, the selective CID file from the data repository;
   removing, by the at least one processing device, a portion of the selective CID file to generate a trimmed CID file; and
   providing, by the at least one processing device, the trimmed CID file to the gateway for storage in a memory of the gateway, the gateway communicatively coupled to the selected IED, wherein the gateway is configured to use the trimmed CID file stored in the memory of the gateway to communicate with the selected IED,
   wherein the selected IED, the plurality of unselected IEDs, and the gateway comprise components of an industrial process control and automation system.

2. The method of claim 1, wherein the selected IED and the plurality of unselected IEDs each include logical devices and logical nodes, wherein the selective CID file includes information associated with the logical devices and the logical nodes of the selected IED, and wherein removing the portion of the selective CID file to generate the trimmed CID file comprises:
   identifying which logical devices and logical nodes of the selected IED are referenced by a process control strategy; and
   removing from the selective CID file the information associated with unreferenced logical devices and logical nodes.

3. The method of claim 1, further comprising:
   storing the CID file in the data repository, wherein obtaining the CID file comprises retrieving the CID file from the data repository.

4. The method of claim 1, wherein providing the trimmed CID file to the gateway comprises downloading the trimmed CID file to the gateway.

5. The method of claim 1, wherein the gateway is communicatively coupled between the selected IED and a process controller of the industrial process control and automation system.

6. The method of claim 1, wherein the gateway is communicatively coupled to the selected IED and the plurality of unselected IEDs.

7. A method, comprising:
   obtaining, by at least one processing device for a selected intelligent electronic device (IED), a configured IED description (CID) file comprising information associated with the selected IED and information associated with a plurality of unselected IEDs;
   removing, by the at least one processing device, a portion of the CID file associated with the unselected IEDs to generate a selective CID file;
   removing, by the at least one processing device, a portion of the selective CID file to generate a trimmed CID file; and
   providing, by the at least one processing device, the trimmed CID file to a gateway for storage in a memory of the gateway, the gateway communicatively coupled to the selected IED, wherein the gateway is configured to use the trimmed CID file stored in the memory of the gateway to communicate with the selected IED,
   wherein the selected IED, the plurality of unselected IEDs, and the gateway comprise components of an industrial process control and automation system.

8. The method of claim 7, wherein the selected IED and the plurality of unselected IEDs each include logical devices and logical nodes, wherein the selective CID file includes information associated with the logical devices and the logical nodes of the selected IED, and wherein removing the portion of the selective CID file to generate the trimmed CID file comprises:
   identifying which logical devices and logical nodes of the selected IED are referenced by a process control strategy; and
   removing from the selective CID file the information associated with unreferenced logical devices and logical nodes.

9. The method of claim 7, further comprising:
   receiving a selection of the CID file from a user;
   displaying the selected IED and the plurality of unselected IEDs associated with the selected CID file; and
   receiving a selection of the selected IED from the user.

10. The method of claim 7, further comprising:
    storing the CID file in a data repository;
    storing the selective CID file in the data repository; and
    storing the trimmed CID file in the data repository.

11. The method of claim 10, further comprising:
    receiving a selection of the selected IED for download to the gateway; and
    based on the selection, retrieving the selective CID file corresponding to the selected IED from the data repository and removing the portion of the selective CID file to generate the trimmed CID file.

12. The method of claim 7, wherein providing the trimmed CID file to the gateway comprises downloading the trimmed CID file to the gateway.

13. The method of claim 7, wherein the gateway is communicatively coupled between the selected IED and a process controller of the industrial process control and automation system.

14. An apparatus, comprising:
    a data repository configured to store, for a selected intelligent electronic device (IED), a configured IED description (CID) file comprising information associated with the selected IED and information associated with a plurality of unselected IEDs; and
    at least one processing device configured to:
      remove a portion of the CID file associated with the unselected IEDs to generate a selective CID file,
      remove a portion of the selective CID file to generate a trimmed CID file, and
      provide the trimmed CID file to a gateway for storage in a memory of the gateway, the gateway communicatively coupled to the selected IED, wherein the gateway is configured to use the trimmed CID file stored in the memory of the gateway to communicate with the selected IED, wherein the selected IED, the plurality of unselected IEDs, and the gateway comprise components of an industrial process control and automation system.

15. The apparatus of claim 14, wherein the selected IED and the plurality of unselected IEDs each include logical devices and logical nodes, wherein the selective CID file includes information associated with the logical devices and the logical nodes of the selected IED, and wherein the at least one processing device is configured to remove the portion of the selective CID file to generate the trimmed CID file by:

identifying which logical devices and logical nodes of the selected IED are referenced by a process control strategy; and removing from the selective CID file the information associated with unreferenced logical devices and logical nodes.

16. The apparatus of claim 14, wherein the at least one processing device is further configured to:

receive a selection of the CID file from a user;

display the selected IED and the plurality of unselected IEDs associated with the selected CID file; and receive a selection of the selected IED from the user.

17. The apparatus of claim 14, wherein the data repository is further configured to store the selective CID file and the trimmed CID file.

18. The apparatus of claim 17, wherein the at least one processing device is further configured to:

receive a selection of the selected IED for download to the gateway; and based on the selection, retrieve the selective CID file corresponding to the selected IED from the data repository and remove the portion of the selective CID file to generate the trimmed CID file.

19. The apparatus of claim 14, wherein the at least one processing device is further configured to provide the trimmed CID file to the gateway by downloading the trimmed CID file to the gateway.

20. The apparatus of claim 14, wherein the gateway is communicatively coupled between the selected IED and a process controller of the industrial process control and automation system.

* * * * *